United States Patent Office 3,558,483
Patented Jan. 26, 1971

3,558,483
CHEMICAL TREATING PROCESS FOR SEWAGE SYSTEMS
Paul T. Dodgson, 5239 N. Sequoia Drive, Fresno, Calif. 93785
Filed Feb. 6, 1969, Ser. No. 796,998
Int. Cl. C02c 1/40
U.S. Cl. 210—62                                5 Claims

ABSTRACT OF THE DISCLOSURE

A process for treating sewage disposal systems having a septic tank and subterranean passageways for dispersing digested sewage, the process including emulsifying a chlorinated benzene, passing the emulsified chlorinated benzene through the septic tank for application to the passageways for restoring the dispersing properties thereof.

BACKGROUND OF THE INVENTION

The present invention relates to sewage disposal systems and more particularly to a process for treating sewage systems disposing of domestic sewage which utilize a septic tank for digesting the sewage and provide an effluent therefrom for dispersal in subterranean passageways, such as cesspools or drainage ditches, for dispersing the effluent into the soil.

For many years, it has been known that chlorinated benzene is an excellent chemical for the treatment of sewage and it is used extensively in municipal sewage plants. However, many households are equipped with domestic sewage disposal systems which utilize a septic tank for digestion of sewage, the action in the tank providing an effluent which is discharged into a cesspool or series of draining ditches for dispersal into the soil. After a time, such cesspools and ditches become lined with deposits of solids which seal up the pores in the soil and impair absorption of the effluent, thus hindering the dispersal thereof.

It has long been known that chlorinated benzene will "open up" the pores and insure continued soil absorption. However, chlorinated benzene has a heavy specific gravity with the result that when used in a domestic sewage disposal system, as described, it passes into the septic tank, where it is largely unneeded, and because of its heavy specific gravity, descends to the bottom of the septic tank and remains. Consequently, it does not reach the cesspool or ditches where its presence is needed. Thus, heretofore, it has been totally ineffective in such a system unless direct access is had to the cesspool or ditches by uncovering them and depositing the chlorinated benzene directly therein. Such digging out is not only laborious and time consuming but it is additionally undesirable because the draining ditches or cesspools are frequently located below landscaped or otherwise utilized areas which are preferably not disturbed.

Essentially, the present invention resides in the discovery that by mixing chlorinated benzene with a suitable emulsifier a resultant product can be obtained which is light enough to pass through the septic tank in a fluid stream and reach the associated cesspool or drainage ditches to permit the chlorinated benzene to accomplish its purpose where needed.

SUMMARY OF THE INVENTION

It is an object to provide an improved process for treating the fluid dispersal facilities of sewage systems.

Another object is to provide a process, in which fluid passes into a first chamber, is drawn off at the top of the first chamber and is directed into a subsequent chamber, for chemically treating the fluid in the subsequent chamber without direct access thereto with a chemical of such specific gravity as to be trapped in the first chamber if simply added thereto.

Another object is to provide a process which modifies chemicals suitable for the purpose of restoring the permeability of earthen walls to facilitate passage thereof through septic tanks for application to the earthen walls of cesspools or drainage ditches associated with the tank.

Another object is to provide a process for easily and economically applying a chemical suitable for improving the permeability of the walls of cesspools and drainage ditches containing septic tank effluents.

Another object is to provide a process for treating cesspools, drainage conduits and the like, without direct access thereto, which receive effluent from septic tanks which normally trap chemicals intended for such cesspools and drainage conduits when effort is made to carry the chemicals in fluid stream therethrough.

These and other objects and advantages are achieved by a process which includes emulsifing a chlorinated benzene or the like to reduce the specific gravity thereof, passing the same through a septic tank for application by the effluent of the septic tank to the walls of cesspools or drainage ditches where the presence of the chlorinated benzene is needed for restoring the permeability of the walls.

BRIEF DESCRIPTION OF THE DRAWING

The drawing is a vertical section through a domestic sewage disposal system illustrative of the practice of the present invention.

DESCRIPTION OF THE INVENTION

In accordance with the present invention there is provided a process for treating the earthen walls of passageways, such as cesspools, drainage ditches and the like, which are employed for dispersing the digested sewage into the soil. After protracted use, the solids in the digested sewage clog and seal the pores of the soil and impair the absorption properties thereof with the result that the digested sewage does not drain properly and a back pressure is created which is detrimental to the operation of the sewage disposal system. It has long been known that chlorinated benzene will "open up" the pores and insure absorption by the soil. Where the digested sewage is dispersed in the soil through open holes or ditches, the chlorinated benzene can be directly applied relatively easily to maintain the desired dispersal properties. However, when such dispersal passageways are buried beneath the surface of the soil, which is the case in domestic sewage disposal systems employing septic tanks and subterranean cesspools or drainage ditches, they are either inaccessible or accessible only with great effort. If chlorinated benzene is directed to the cesspools or ditches in fluid stream through the associated septic tanks, it never reaches its destination. This results from the fact that chlorinated benzene has a high specific gravity with the result that when it is used in domestic sewage disposal systems, it descends to the bottom of the septic tanks and is trapped. Thus, the use of chlorinated benzene in such a system for treatment of the dispersal passageways to improve the absorption quality thereof has been impractical unless such systems are physically opened up for direct access.

Referring to the drawing, a conventional subterranean septic tank is shown at 10 having an input conduit 11 through which influent sewage is directed into the tank. A discharge conduit 12 is extended from the upper portion of the tank and connects to a cesspool 13 having

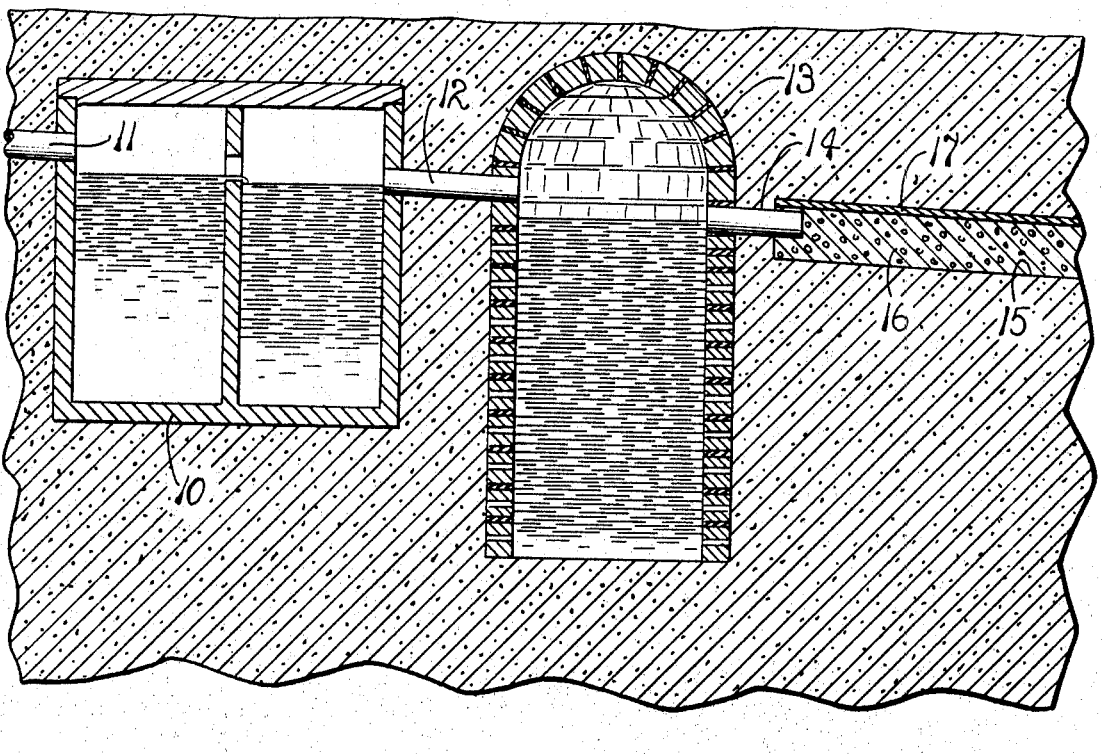

nature and proportionate of the ingredients may be made without departing from the spirit and scope of the invention, and only such limitations should be imposed as are indicated in the appended claims.

Having described my invention, what I claim as new and desire to secure by Letters Patent is:

1. In a fluid system in which a fluid passes into a first chamber for treatment, is drawn off at the top of the first chamber after treatment, and is directed into a subsequent chamber, a process for chemically treating the fluid in the subsequent chamber without direct access thereto with chlorinated benzene which is of such greater specific gravity than the fluid as to be trapped in the first chamber if simply added to the fluid entering said first chamber comprising mixing chlorinated benzene with an emulsifier to form an emulsion of a specific gravity less than that of said fluid, introducing the emulsion into the first chamber so that the emulsion remains on the top of the fluid therein, and directing further aqueous fluid into the first chamber to decant said emulsion from the first chamber into the subsequent chamber.

2. The process of claim 1 as applied to a sewage system in which the emulsifier is sulfonate ethoxylate.

3. In a fluid system in which a fluid passes into a first chamber for treatment, is drawn off at the top of the first chamber after treatment, and is directed into a subsequent chamber, a process for chemically treating the fluid in the subsequent chamber without direct access thereto with a chemical of such greater specific gravity than the fluid as to be trapped in the first chamber if simply added to the fluid entering the first chamber comprising mixing a chemical selected from the group consisting of carbon tetrachloride, chlorinated benzene, chloroform, ethylene dichloride, methylene chloride, monochlorobenzene, orthodichlorobenzene, pentachlorobenzene, tetrachlorobenzene, trichlorethylene, trichlorobenzene, and trichloroethane with an emulsifier to form an emulsion of a specific gravity less than that of said fluid, introducing the emulsion into the first chamber so that the emulsion remains on the top of the fluid therein, and directing further aqueous fluid into the first chamber to decant said emulsion from the first chamber into the subsequent chamber.

4. The process of claim 3 as applied to domestic sewage systems wherein the emulsifier is selected from the group consisting of a blend of ethylene oxide as a nonionic constituent and a sulfonate as an anionic constituent.

5. A process for treating a sewage disposal system having a sewage digestion tank and a cesspool connected to the top of the tank for dispersing the digested sewage for absorption into the soil, comprising:
 (a) emulsifying a chlorinated benzene with sulfonate ethoxylate to reduce the specific gravity of the benzene;
 (b) adding the emulsified chlorinated benzene to the contents of the sewage digestion tank; and
 (c) floating the emulsified chlorinated benzene out of the sewage digestion tank and into the cesspool for dispersing the digested sewage.

References Cited

UNITED STATES PATENTS 2,805,989  9/1957  Greer _____ 210—18X

MICHAEL ROGERS, Primary Examiner